Dec. 31, 194        E. W. SWANSON        2,226,644

VOLTAGE REGULATOR

Filed Oct. 22, 1938

EDWIN W. SWANSON, Inventor

By Axel C. Benson

His Attorney

Patented Dec. 31, 1940

2,226,644

UNITED STATES PATENT OFFICE 2,226,644

VOLTAGE REGULATOR

Edwin W. Swanson, Hopkins, Minn., assignor to Electric Machinery Mfg. Company, Minneapolis, Minn.

Application October 22, 1938, Serial No. 236,474

5 Claims. (Cl. 171—229)

My invention relates to voltage regulators for sources of alternating current and particularly alternating-current generators and has for an object to provide a voltage regulator which will operate with variable load or variable speed of the generator to maintain a substantially constant voltage at the source over an appreciable variation of speed or frequency of the generator.

Another object of the invention resides in providing a voltage regulator which is particularly adaptable to compensate for variation in voltage due to appreciable variation of the frequency of the generator.

In my invention for Voltage regulator disclosed in application for patent Serial Number 81,705 filed May 25, 1936, I found that constant voltage regulation could only be procured within relatively small limits of variation in frequency from normal frequency.

It is an object of the present invention to provide a voltage regulator of similar type by means of which voltage regulation can be procured so as to provide substantially constant voltage over a much greater range of frequency than is possible with the aforementioned invention.

In carrying out my objects, I utilize two impedances connected in series, one being a pure resistive impedance and the other being a reactive impedance, either a condensive reactive impedance or an inductive reactive impedance. These two impedances are connected in series across a line which is either directly energized from the power line whose voltage is to be regulated or enegized by said power line through suitable transformers or other apparatus. In conjunction with said impedances I employ a control circuit which shunts one, only, of said impedances and which is connected to a regulating circuit containing proper apparatus for regulating the voltage of the power line. Where a condensive impedance is employed the control circuit is shunted across the resistive impedance. Where an inductive impedance is employed, the control circuit is shunted across the same. I have found that, in either case, the action of the regulator procures more constant voltage for greater variation in frequency than would otherwise be possible.

Other objects of the invention reside in the novel combination and arrangement of parts and in the details of construction hereinafter illustrated and/or described.

Figure 1:
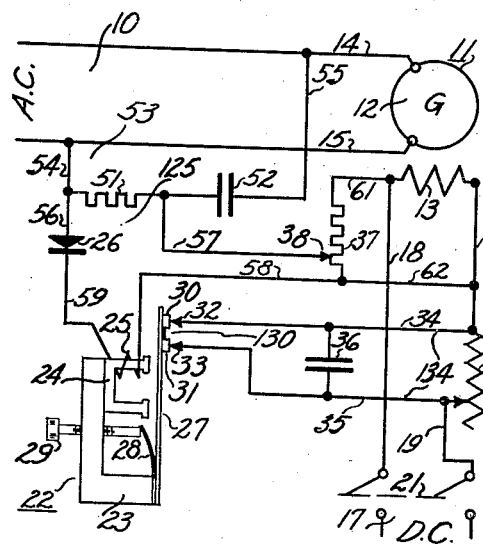
Fig. 1 is a wiring diagram of an embodiment of my invention applied to an alternating-current generator.

Referring to Fig. 1 of the drawing, an alternating-current generator 11 is illustrated which is provided with an armature winding 12 and a field winding 13. The armature winding 12 is connected to an alternating-current power line, indicated by the reference character 10. This line includes conductors 14 and 15. The field winding 13 is energized with direct current derived from a direct-current line 17 which is connected by means of a field switch 21 to two conductors 18 and 19. The conductor 18 is directly connected to one side of the field winding 13, while the conductor 19 is connected to an adjustable resistor or rheostat 20. Another conductor 19a is connected to the other terminal of rheostat 20 and to the other side of the field winding 13. The generator 11 is driven by a prime mover, not shown in the drawing.

The invention includes a relay 22 which has a non-magnetic base 23. Mounted on this base is a magnetic U-shaped core 24, preferably of laminated construction. A relay winding 25 is disposed on the core 24, and is energized as will be subsequently described in detail. Cooperating with the core 24 is a magnetic armature 27 of the vibratory type which is preferably constructed of resilient material such as spring steel. An adjustment for the armature 27 comprising a resilient member or leaf spring 28 engages the armature 27 and is adapted to vary the resistance of the same to attraction by the core 24. An adjusting screw 29, threaded in the base 23, engages the spring 28 and exerts pressure upon the same to move the said spring toward armature 27 and adjust the resistance to attraction by the core 24 of the armature 27.

The relay 22 includes a switch 130 which comprises two stationary contacts 32 and 33 and two movable contacts 30 and 31 operated or moved by means of the armature 27 and adapted to make and open contact with contacts 32 and 33. The contacts 30 and 31 are electrically connected together through the armature 27 and serve to connect the contacts 32 and 33 together when in contact therewith.

Relay winding 25 is connected in a circuit 125 which I have designated as a control circuit and which is energized by the voltage of the generator 11. In conjunction with this control circuit I employ an impedance 51 which is preferably of the pure resistive type and also an impedance 52 which in form of the invention shown in Fig. 1 is a condensive impedance. The two impedances 51 and 52 are connected in series across a line 53 which comprises two conductors 54 and 55. The conductor 54 is connected to the conductor 15 of line 10, and the conductor 55 is connected to the conductor 14 of line 10. The control circuit 125 includes a conductor 56 which is connected to a half-wave rectifier 26 and to one end of the impedance 51 and the conductor 54. This circuit also includes a conductor 57 which is connected to the connection between the impedance 51 and the impedance 52 and which is further connected at its other end to the adjustable contact 38 of a variable resistance 37. One of the ends of the resistance 37 is connected by means of a conductor 58 with one side of the winding 25 while the other side of said winding is connected by means of a conductor 59 with the rectifier 26. It will thus be seen that the circuit 125, which includes rectifier 26 and winding 25, is shunted across the pure resistive impedance 51 and that both of the impedances are connected in series across the line 53 and also the power line 10. It can readily be comprehended that, if desired, the line 53 may be connected to the secondary of a transformer and that the primary of said transformer be connected across the power line 10. Since such methods of connecting electrical apparatus is well known in the art, the use of potential transformers have not been shown in this figure.

In the operation of my invention it becomes necessary to procure direct current for the control circuit 125. For this purpose, the resistance 37 is employed which is connected across the conductors 18 and 19a by means of conductors 61 and 62. Conductors 18 and 19a are, as previously described, connected to the direct-current line 17.

The switch 130 is connected in a circuit 134 which I have designated as the regulating circuit. This circuit includes two conductors 34 and 35 which are connected to the contacts 32 and 33 respectively of switch 130. Conductor 34 is connected to the conductor 19a and conductor 35 is connected to the movable or adjustable contact of the rheostat 20. In order to reduce the sparking and pitting at the contacts a condenser 36 is employed which is connected across the fixed contacts 32 and 33. It will readily be noted that one pair of contacts could be utilized to make and break the regulator circuit 134, but this would materially increase the heating arcing and pitting.

The operation of the above described embodiment of my invention can best be explained as follows: The armature 27 is so arranged that it will respond to the variations in current produced by the current pulses flowing in the control circuit 125. The spring 28 is so designed and screw 29 so adjusted that initiation of movement of said armature occurs only after the magnitude of the current in said circuit reaches a predetermined value. Assume that the generator voltage drops below its normal value. Since the rectifier 26 allows current to flow only in one direction and the generator voltage is below normal value, the pulsating current flowing in the relay winding 25 will cause a pulsating magneto-motive force of lesser magnitude to attract the relay armature to the core 24. Due to the fact that a certain value of current is required to initiate movement of armature 27, the time interval that said armature is attracted to the core 24 is less when the voltage is below normal value. In such case, the switch mechanism 130 remains closed during the greater portion of each cycle. While the switch mechanism 130 is closed, the rheostat 20 is short-circuited so that a greater amount of direct current flows in the field winding 13 and thereby causes the generator voltage to increase. Assume that in conjunction with the drop in voltage the frequency of the generator also drops. In such case the drop in voltage across the resistive impedance 51 decreases more rapidly than the drop in voltage across the condensive impedance 52. This causes the switch 130 to remain closed during a still greater portion of each cycle and the rheostat 20 to remain short-circuited for a greater length of time so that a still greater amount of direct current flows in the field winding 13. This is due to the fact that the reactance of the condensive impedance 52 becomes greater as the frequency decreases and which results in a corresponding decrease in the drop across the resistive impedance 51.

Assume that the generator voltage rises above its normal value. In this case, the pulsating current flowing in the relay winding 25 will increase causing a pulsating magnetomotive force of greater magnitude to attract relay armature 27 to the core 24. This will have the effect of holding armature 27 attracted during a longer duration of time, thus holding the switch mechanism 130 open during a greater portion of each cycle. While the switch mechanism 130 is open, the resistor or rheostat 20 is not short-circuited so that a smaller amount of direct current flows in the field winding 13 and thereby causes the generator voltage to decrease. Assume now that the frequency of the generator 11 also increases. This would decrease the voltage drop across the condensive impedance 52 and in turn increase the drop across the resistive impedance 51 which causes the armature 27 to be attracted by core 24 for a still longer period of time. This would allow a lesser amount of current to flow through the field winding 13 and would further reduce the voltage of the generator 11.

Adjustment may be had by means of adjusting screw 29. By turning the screw 29 to bring increased pressure upon the resilient member or leaf spring 28, the value of the current required to initiate movement of the armature 27 is increased so that the relay operates to maintain a higher voltage. The reverse is true when the screw 29 is turned in the opposite direction.

Figure 2:
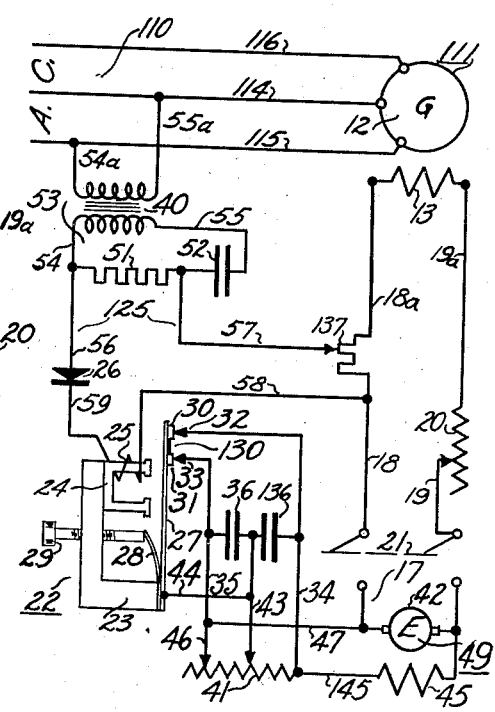
Fig. 2 is a wiring diagram of a modification of my invention.

In Fig. 2 I have shown a modification of the invention. Since most of the parts or elements of this form of the invention are identical with those shown in Fig. 1 the description will not be repeated and the same reference numerals will be used to designate corresponding elements or parts.

In Fig. 2 I have shown a three-phase generator 111 which is used to furnish three-phase power to a three-phase power line 110. This power line includes conductors 114, 115 and 116. The generator 111 includes windings 12 which are connected to the conductors 114, 115 and 116 and a field winding 13 which is energized from an exciter 49. This exciter includes an armature 42 which is connected to a direct-current line 17. The exciter 49 also includes a field winding 45. A field switch 21 connects the line 17 with two conductors 18 and 19. Conductor 18 is connected to an adjustable resistor 137 which in turn is connected by conductor 18a with one end of the field winding 13. The field switch 21 is further connected by a conductor 19 to an adjustable resistor or rheostat 20 which in turn is connected by conductor 19a to the other end of the field winding 13.

In Fig. 2, the line 53, instead of being directly connected to the power line 110, is connected to the secondary of a transformer 40. The primary of this transformer is connected by means of conductors 54a and 55a to one phase of the power line 110. It will also be noted that the resistance 137 furnishing direct current to the circuit 125 is connected in series with the field winding 13 of generator 111 instead of in parallel therewith, as is the case in Fig. 1.

In series with the field winding 45 of exciter 49 is a variable resistor or rheostat 41. The two conductors 34 and 35 which lead from the fixed contacts 32 and 33 of switch 130 are connected to one end of the said rheostat and to the adjustable contact thereof. Across these two conductors are two condensers 36 and 136 which are connected in series. A conductor 43 connected between these condensers is connected to a tap on the resistance 41. This conductor is also connected to another conductor 44 which is connected to armature 27. By means of this construction, direct-current excitation for generator 111 is controlled by varying the field current of exciter 49 instead of by varying the current output of the same. Also separate condensers are provided, one for each of the contacts of switch 130.

The operation of the invention shown in Fig. 2 is substantially the same as that shown in Fig. 1 excepting that a slightly greater degree of efficiency is procured by having the resistance 137 in series with the generator field winding 13 than in parallel therewith. Also greater efficiency results in the control of the field current of the exciter rather than the output current of the same.

Figure 3:
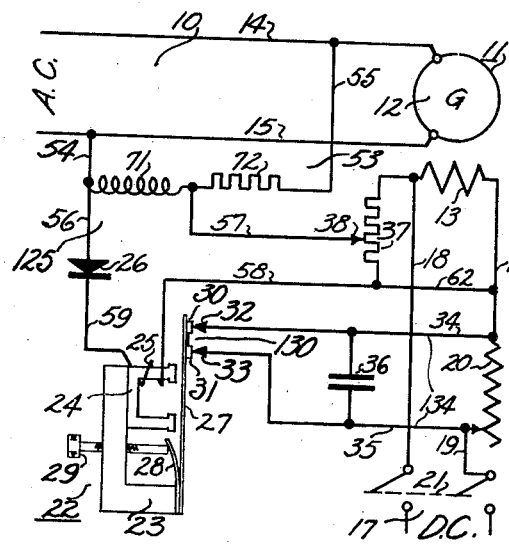
Fig. 3 is a wiring diagram of still another modification of my invention.

In Fig. 3 I have shown a modification of the invention in which an inductive impedance is used instead of the condensive impedance. In Fig. 3 the inductive impedance is indicated by the reference numeral 71 and the pure resistive impedance by numeral 72. Both being connected in the line 53 which is connected across the line 10. Where an inductive impedance is used, the control circuit 125 is connected across the inductive impedance instead of across the pure resistive impedance as is the case in Fig. 1. With the control circuit so connected, the performance of the modification shown in Fig. 3 is substantially the same as that shown in Fig. 1.

Figure 4:
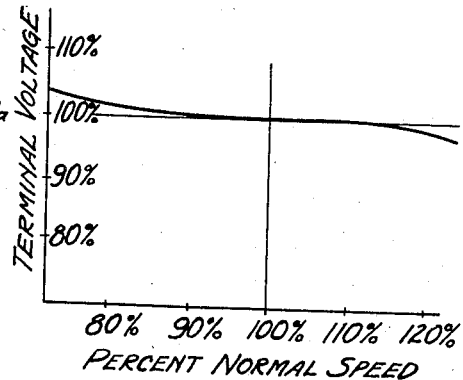
Fig. 4 is a voltage diagram of a generator showing the results obtainable with my invention.

In Fig. 4 I have shown a voltage diagram procured with the use of my invention in conjunction with an alternating-current generator. In this diagram, terminal voltage is plotted as ordinates and percent normal speed is plotted as abscissas. From this diagram it will be noted that the voltage remains substantially constant to within 10% above or below normal speed or frequency. With other types of voltage regulators, it has been difficult to maintain constant voltage much over 4 or 5% variation in speed or frequency from normal.

The advantages of my invention are manifest. With my invention the voltage may be maintained uniform over a much greater range of speed variation than has heretofore been possible. My device is extremely simple in construction and does not require any delicate parts. My invention is highly efficient and utilizes but a small amount of energy in operation.

It will, of course, be understood that various changes may be made in the form, details, proportions and arrangements of the parts, without departing from the scope of my invention which, generally stated, consists in a device capable of carrying out the objects above set forth and in the novel parts and combination of parts disclosed and defined in the appended claims.

What I claim as new and desire to secure by Letters Patent of the United States is:

1. In combination, a resistive impedance and only one type of reactive impedance connected in series across a line energized from a power line whose voltage is to be regulated, the voltage drop across one of said impedances increasing and across the other decreasing with increase in the frequency of the power line voltage throughout the entire range of variation of frequency of the power line voltage, a control circuit shunting the impedance whose voltage drop increases, a relay including a core, a winding thereon and a vibratory armature, said winding being connected in said control circuit, a half-wave rectifier for supplying intermittent fractional current pulses to said winding, said armature being capable of movement in conformity with said current pulses, and means operated by said armature for regulating the voltage.

2. In combination, a resistive impedance and only one type of reactive impedance connected in series across a line energized from a power line whose voltage is to be regulated, the voltage drop across one of said impedances increasing and across the other decreasing with increase in the frequency of the power line voltage throughout the entire range of variation of frequency of the power line voltage, a control circuit shunting the impedance whose voltage drop increases, a relay including a core, a winding thereon and a vibratory armature, said winding being connected in said control circuit, a half-wave rectifier for supplying intermittent fractional current pulses to said winding, a source of direct current in said control circuit opposing the flow of current through said rectifier, said armature being capable of movement in conformity with said current pulses, and means operated by said armature for regulating the voltage.

3. In combination, a condensive impedance and a resistive impedance connected in series across a line energized from a power line whose voltage is to be regulated, a control circuit shunting said resistive impedance only, a relay including a core, a winding thereon and a vibratory armature, said winding being connected in said control circuit, a half-wave rectifier for supplying intermittent fractional current pulses to said winding, a source of direct current in said control circuit opposing the flow of current through said rectifier, said armature being capable of movement in conformity with said current pulses, and means operated by said armature for regulating the voltage.

4. In combination, an inductive impedance and a resistive impedance connected in series across a line energized from a power line whose voltage is to be regulated, a control circuit shunting said inductive impedance only, a relay including a core, a winding thereon, and a vibratory armature, said winding being connected in said control circuit, a half-wave rectifier for supplying intermittent fractional current pulses to said winding, a source of direct current in said control circuit opposing the flow of current through said rectifier, said armature being capable of movement in conformity with said current pulses, and means operated by said armature for regulating the voltage.

5. In combination, a circuit connected across a line energized from a power line whose voltage is to be regulated and having only two impedances connected in series, one of said impedances being a resistive impedance and the other of said impedances being a reactive impedance of a single type, the voltage drop across one of said impedances increasing and across the other impedance decreasing with increase in the frequency of the power line voltage throughout the entire range of variation of frequency of the power line voltage, a control circuit shunting the impedance whose voltage drop increases, a relay including a core, a winding thereon and a vibratory armature, said winding being connected in said control circuit, a half-wave rectifier for supplying intermittent fractional current pulses to the winding, said armature being capable of movement in conformity with said current pulses, and means operated by said armature for regulating the voltage.

EDWIN W. SWANSON.